(12) United States Patent
Ohrt et al.

(10) Patent No.: US 11,119,301 B2
(45) Date of Patent: Sep. 14, 2021

(54) IMMERSION MATRIX, ITS USE AND IMMERSION DEVICE

(71) Applicant: CARL ZEISS MICROSCOPY GMBH, Jena (DE)

(72) Inventors: Thomas Ohrt, Golmsdorf (DE); Thomas Kalkbrenner, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 481 days.

(21) Appl. No.: 16/144,839

(22) Filed: Sep. 27, 2018

(65) Prior Publication Data
US 2019/0094512 A1 Mar. 28, 2019

(30) Foreign Application Priority Data
Sep. 27, 2017 (DE) .......................... 102017217192.8

(51) Int. Cl.
*G02B 21/33* (2006.01)
*G01N 21/15* (2006.01)
*G02B 21/02* (2006.01)
*G02B 27/00* (2006.01)

(52) U.S. Cl.
CPC ............ *G02B 21/33* (2013.01); *G01N 21/15* (2013.01); *G02B 21/02* (2013.01); *G02B 27/0068* (2013.01)

(58) Field of Classification Search
CPC .... G02B 21/02; G02B 21/33; G02B 27/0068; G01N 21/15
USPC ........ 359/656–661, 368, 391, 392, 396, 398
See application file for complete search history.

(56) References Cited

U.S. PATENT DOCUMENTS

| 6,866,659 B2 * | 3/2005 | Nemati ................ | A61B 5/0059 |
| | | | 604/500 |
| 7,158,896 B1 * | 1/2007 | Singh .................... | G03F 7/2041 |
| | | | 438/14 |
| 9,939,625 B2 * | 4/2018 | Herrmann ............. | G02B 21/248 |
| 9,971,139 B2 * | 5/2018 | Fujioka ................. | G02B 21/12 |

(Continued)

FOREIGN PATENT DOCUMENTS

| DE | 102013107297 A1 | 1/2015 |
| DE | 102014101172 A1 | 7/2015 |

(Continued)

OTHER PUBLICATIONS

Hell, S., et al., "Aberrations in confocal fluorescence microscopy induced by mismatches in refractive index", Journal of Microscopy vol. 169, Pt. 3, Mar. 1993, pp. 391-405.

(Continued)

*Primary Examiner* — Evelyn A Lester
(74) *Attorney, Agent, or Firm* — Brake Hughes Bellermann LLP

(57) ABSTRACT

The invention relates to an immersion matrix (5), designed for adjusting optical properties at interfaces of optical arrangements, having a porosity with pores of at least one pore size selected from a range from >20 nm to 200 µm and/or nanopores in the material of the immersion matrix (5), wherein the nanopores have at least one average pore size selected from a range of 0.5 nm to 20 nm, and an elasticity modulus E selected from a range of 0.1-100 MPa. The invention furthermore relates to the use of the immersion matrix (5), an arrangement with the immersion matrix and an immersion device.

21 Claims, 5 Drawing Sheets

(56) References Cited

U.S. PATENT DOCUMENTS

| | | | | |
|---|---|---|---|---|
| 2005/0048223 A1* | 3/2005 | Pawloski | ............ | G03F 7/70341 |
| | | | | 427/600 |
| 2006/0275918 A1* | 12/2006 | Harada | .................. | G02B 21/33 |
| | | | | 436/174 |
| 2015/0015942 A1* | 1/2015 | Steinmeyer | .......... | G02B 21/241 |
| | | | | 359/383 |
| 2015/0241682 A1* | 8/2015 | Kues | ..................... | C08F 120/10 |
| | | | | 524/156 |
| 2016/0154236 A1* | 6/2016 | Siebenmorgen | ... | G02B 21/0032 |
| | | | | 359/385 |
| 2018/0321480 A1* | 11/2018 | Ohrt | ....................... | G02B 21/02 |

FOREIGN PATENT DOCUMENTS

| | | |
|---|---|---|
| DE | 102015221044 A1 | 5/2017 |
| EP | 2256535 A1 | 12/2010 |

OTHER PUBLICATIONS

Liu, P. Y., et al., "Cell refractive index for cell biology and disease diagnosis: past, present and future", Royal Society of Chemistry, Lab Chip, vol. 16, 2016, pp. 634-644.

Ta, Van Doung, et al., "Laser textured superhydrophobic surfaces and their applications for homogeneous spot deposition", Applied Surface Science, vol. 365, Jan. 2016, pp. 153-159.

Yao, Lin, et al., "Recent progress in antireflection and self-cleaning technology—From surface engineering to functional surfaces", Progress in Materials Science, vol. 61, Apr. 2014, pp. 94-143.

German Search Report with partial English Translation for German Application No. 102017217192.8, dated on Jan. 25, 2018, 15 Pages.

* cited by examiner

IMMERSION MATRIX, ITS USE AND IMMERSION DEVICE

CROSS REFERENCE TO RELATED APPLICATIONS

This application claims priority to German Patent Application 102017217192.8, filed Sep. 27, 2017, the disclosure of which is incorporated herein by reference in its entirety.

TECHNICAL FIELD

The invention relates to an immersion matrix, an arrangement comprising an immersion matrix, the use thereof and an immersion device.

BACKGROUND

Particularly in living-cell microscopy, the exact refractive index of the sample is usually unknown. This relates not (only) to the embedding medium and/or the buffer used but above all to the interior of the sample which can be given, for example, by cells, (tumor) spheroids, tissue sections or whole organisms.

Since these samples are usually stored and investigated in aqueous solutions (buffer solutions), water immersion objectives are mostly used, for historical reasons as well. These water immersion objectives are optimized for a refractive index of n=1.33 (refractive index of water). However, the refractive index of living cell samples differs from n=1.33 (see, for example, Liu, P. Y. et al., "Cell refractive index for cell biology and disease diagnosis: past, present and future; Lab on a Chip," 16: 634-644 (2016), which is incorporated herein by reference).

For example, the refractive index of the cytosol of typical cells is in the range of 1.36-1.39 and thus differs significantly from the refractive index of water. A resulting maladjustment of optical arrangements leads to aberrations, which limit the optical performance of the microscope, in particular the penetration depth. Compensating for these aberrations is complex and expensive, if even possible, and can be done, for example, by means of adaptive optics, for example, deformable mirrors.

This applies in particular to microscope systems that have at least one optical axis that is not perpendicular to a cover glass. The cover glass, which in inverse microscopy may also be the bottom of a sample holder, for example, a Petri dish, a (micro)titer plate or a transparent plate, is passed through by a detection radiation to be detected at an angle not equal to 90°, i.e. obliquely.

Errors occurring in the adjustment of the refractive index can lead to asymmetric aberrations, such as astigmatism, coma, and other higher-order aberrations (e.g., trefoil, quatrefoil). These aberrations are even less tolerable than symmetrical aberrations, which can occur in conventional arrangements with incident light and primarily occur as spherical aberrations. Although such symmetrical errors are initially more readily tolerable by the user, they still ultimately result in a significant limitation, for example, of the optical penetration depth of the microscope.

Suitable immersion media can be used to reduce aberrations caused by the passage of illumination radiation and/or detection radiation.

Common immersion media are, for example, water, silicone oil, glycerol and oil, which are used together with a correspondingly designed immersion objective. In microscopy, the use of immersion objectives offers numerous advantages, all of which ultimately arise from the achievable higher numerical apertures of the objectives. These advantages are, for example, a higher spatial resolution, a higher light-harvesting efficiency, an improved signal-to-noise ratio or signal-to-background ratio, shorter exposure times and better temporal resolution as well as reduced phototoxicity.

Since the samples can be embedded and fixed differently, there are different classes of immersion media to enable working as closely as possible to the refractive index of the sample. Typical immersion media are water, organic substitutes for water (e.g., ZEISS Immersol W), glycerol (e.g., ZEISS Immersol G) and special immersion oils (e.g., ZEISS Immersol F, Immersol HI). All these immersion media are liquid at the customary temperature. Only when the immersion medium has exactly the same optical parameters as the sample will optimal image quality, maximum signal intensity and penetration depth be achieved (see Hell, S. et al., "Aberrations in confocal fluorescence microscopy induced by mismatches in refractive index." Journal of Microscopy, 169: 391-405 (1993), which is incorporated herein by reference).

In principle, the numerical aperture can be maximized by using immersion media with as high a refractive index as possible, wherein a reasonable upper limit is given by the refractive index of the cover glass. With a perfectly adjusted refractive index ($n_{immersion}=n_{cover\ glass}$), the cover glass is no longer optically active. Such a situation, which is typically achieved with oil immersion objectives, is schematically shown in FIG. 1a.

A sample 1, a sample holder 2 in the form of a cover glass 2, and an objective 3, as well as an immersion medium 4 between cover glass 2 and objective 3 are shown. The path of focused illumination radiation is shown in simplified form as a broken solid line.

In the case of biological samples, it often happens that the refractive index of the sample medium differs from that of the cover glass 2 and that of the immersion (immersion medium 4). In this situation, optimal work can only be carried out with oil immersion objectives relatively close to the cover glass surface. The reason for this is that the refractive index jump causes aberrations, in particular spherical aberrations, which become more pronounced the further one penetrates into the sample. For microscopy, especially concerning living cells, water immersion objectives are therefore more suitable (FIGS. 1b and 1c). Since the cells are in an aqueous environment, the refractive indices of the immersion liquid and the sample medium are very similar, only the cover glass 2 itself differs. If this is optically corrected, no spherical aberrations will occur with deeper penetration into the sample (FIG. 1c). However, this correction only works for a known and specific cover glass thickness and glass type. Water immersion objectives therefore usually have a correction function, which can correct unavoidable cover glass thickness variations by shifting a lens or lens group in the objective 3 (e.g., a correction collar) as indicated by the double arrow (FIGS. 1b and 1c).

Besides the above-mentioned advantages for the maximum achievable image quality through the use of the above-mentioned immersion media, many disadvantages however also arise. Since all immersion media are liquid at the customary temperature, this often gives rise to problems, which can be classified as limitations of the application possibilities and of the handling as well as the occurrence of technical risks. Limitations of the application possibilities consist, for instance, of long working distances not being feasible. This affects, for example, the fields of electrophysiology, stereomicroscopy and macroscopy. In multi-position experiments, the immersion medium can be smeared by the sample bottom or a cover glass, as a result of which the immersion medium is reduced and can result in separation and the sample or the microscope system becoming contaminated every time the focus position is changed in an XY plane, for example. Furthermore, a lot of immersion medium is consumed. Evaporation can change the refractive index of the immersion medium during long-term experiments, for example, if one component of the immersion medium is more readily volatile than another component of the immersion medium. Automation of the immersion process can only be implemented at a high cost.

The handling of traditional immersions with immersion liquids is rather complicated and there is often a loss of an already identified region of interest (ROI) which is shown, for example, in the field of view (FOV) when, for example, a change is made from an overview objective to a measurement objective with immersion and back again. Access to a sample space in which the sample to be observed is placed is frequently severely restricted and cleaning is difficult. If the immersion medium has a high viscosity, undesired detachment of the cover glass can also occur. Possible occurrences of damage to the objective and instrument due to penetrating immersion liquid are to be regarded as technical risks.

According to the prior art, the immersion liquid is placed on the objective without spatial delimitation. In unfavorable conditions, the immersion liquid can in this case flow away from the objective, making re-immersion necessary. Even during movements in the Z direction, that is, during changes of the distance between the objective and the cover glass, the immersion medium can become separated from the cover glass, in particular when the distance is increased. Particularly in the case of autoimmersion, the immersion liquid flowing away is always a risk for the microscope system, since the quantities of liquid can spread and penetrate into the microscope stand, for example.

Many of these above-mentioned problems can be avoided with an elastomer immersion. In this type of immersion, non-toxic elastomers are used as immersion media. Such elastomers are, for example, elastically deformable plastics, e.g., siloxanes, such as PDMS, PMMA, PE gels and/or natural polymers, such as gelatin, agarose or pectin, whose glass transition temperature is below the operating temperature. The elastomers can elastically deform under tensile and compressive loading (see e.g., US Pat. Pub. No. 2015/0241682 A1, which is incorporated herein by reference).

Problems with the use of elastomer immersion can occur when the sample is moved laterally. Rapid and strong movements in the Z direction, for example, during focusing, also lead to deformations of the immersion body and can exert high forces on the cover glass and/or the sample. The sample can be displaced in the process. Changes in the XYZ coordinates in multi-position experiments lead to problems during restarting, up to and including destruction of the sample during an unwanted displacement of the cover glass causing shearing of the embedding medium and/or tearing of the sample. A further difficulty lies in producing suitable polymers having a suitable refractive index for the most varied samples and objectives. Moreover, an elastomer immersion can collect contaminants, which then may have a negative effect on image quality.

SUMMARY

The aim of the invention is to propose a possibility for immersion, through which the disadvantages known from the prior art are reduced or avoided.

The aim is achieved by an immersion matrix described herein, in particular, having the features of claim 1. Independent claims relate to the use of the immersion matrix and to an immersion device. Additional advantageous developments are the subject-matter of the dependent claims.

The aim is achieved by an immersion matrix which is designed to adjust optical properties, in particular the refractive index, at interfaces of optical arrangements. The immersion matrix has a porosity, wherein the pores have at least one pore size. This at least one pore size is selected from a range of more than 20 nm to 200 µm.

The average pore size is, for example, a mean diameter, possibly plus or minus a single or a double standard deviation, of the cavities (pores) formed in the immersion matrix. The pores are at least partially delimited by walls and webs of the material of the immersion matrix.

The pore size is determined by making an appropriate number of cuts, for example three, five or ten cuts, through the immersion matrix and measuring, in the sectional plane, the greatest extent of each of the pores located in the sectional plane. In doing so, a microscope with a measuring ocular can be used, for example, or the measurement of the pores be carried out using image data of the sectional planes. For example, 66, 70, 80 or 95% of the measured values determined in this way are within the pore sizes envisaged for the invention. The same procedure is used in the determination of the nanopores described below.

An elastic structure in the form of an immersion matrix, which can also be considered as an immersion sponge or foam, can be combined with an immersion liquid. The immersion matrix can absorb liquid immersion media, wherein the optical effects of the immersion matrix are adjusted to those of the absorbed liquid.

In the sense of a structured reservoir or container, the immersion matrix can serve to give the immersion medium a larger potential dimension (working distance) and to thereby spatially delimit and hold the immersion medium.

The immersion matrix may have different shapes. Basically, the function of the immersion matrix is not limited to any specific shape. However, advantageous effects in the interaction of the immersion matrix with, for example, an objective and/or with a cover glass or a sample can be achieved by different shapes. The immersion matrix may take the form of a cuboid or a cylinder. The immersion matrix can also take the form of a cone or a prism. In this case, a first lateral surface has a first planar extent. An opposite second lateral surface has a second extent, wherein the extent of the second lateral surface is greater than the extent of the first lateral surface. Such a shape is advantageous, for example, when objectives with a large numerical aperture and/or a large working distance range are used. The second lateral surface with the greater extent is then used facing the sample or the cover glass.

An elongated shape, such as a cylindrical shape, helps to make large changes to the working distance without having the immersion medium separate. Furthermore, combinations of the mentioned shapes of the immersion matrix can be implemented, such that the immersion matrix takes the form of, for example, a truncated cone, a cone or a truncated pyramid.

In other embodiments, the immersion matrix can have pores with at least one pore size selected from a range of more than 200 nm to 200 µm, for example, from a range of 1 µm to 100 µm or 1 µm to 200 µm.

The material of the immersion matrix preferably can have a refractive index $n_{mat}$ selected from a range of 1.40 to 1.8 and can be selected, for example, from the substance group of polyurethanes, polyester urethanes, polyimides. In further embodiments, the material may be a mixture of polyurethane and silicon dioxide. Organic and/or inorganic substances and compounds as well as mixtures or composites thereof can serve as basic elements of the material. So-called aerogels can be used. These aerogels are prepared, for example, by known sol-gel processes and can have purely organic constituents, purely inorganic constituents, or mixtures thereof. For example, a mixture of organic and inorganic constituents can include entirely or predominantly polyurethane and silicon dioxide.

Further materials of the immersion matrix can be polymer foams, for example. These polymer foams can be expanded under high pressure and form foams that have a volume that is 10 to 70 times, in particular 20 to 50 times, greater than the volume of the corresponding starting material. Examples thereof are polystyrene (PS) as starting material and expanded polystyrene (EPS). Another possible material of the immersion matrix is polymethyl methacrylate (PMMA) in different processing states. Foamed polyurethanes and polyester urethanes are also possible materials.

The elasticity modulus E of the immersion matrix according to the invention is advantageously less than 1.5 GPa. The elasticity modulus E of the immersion matrix is advantageously selected from a range of 0.1-800 MPa, better from a range of 0.1-400 MPa, preferably from a range of 0.1-100 MPa. The elasticity modulus E is determined according to EN ISO 527-1. The elasticity modulus E is to satisfy the above values when the immersion matrix is filled with an immersion liquid. Combinations of immersion matrix and immersion liquid that have elasticity modulus E of 1.5 GPa and more do not fulfill the aim to be achieved.

The immersion matrix without an immersion liquid filling has an elasticity modulus E of 0.1-1200 MPa, in particular from a range of 0.1-800 MPa, better from a range of 0.1-400 MPa, preferably from a range of 0.1-100 MPa.

The pores of the immersion matrix can be closed pores (closed porosity, closed-pore) or open pores (open porosity, open-pore). In the case of open porosity, more than 50% of the pores are open, are connected to each other and, for example, hydraulically communicate with each other in the sense of communicating tubes.

The material of the immersion matrix may additionally or alternatively be nanoporous. It contains nanopores that have at least an average pore size selected from a range of 0.5 nm to 20 nm, preferably of 0.5 nm to 10 nm. By being formed in the walls and webs of the material, the nanopores reduce the (optical) compactness of the material of the immersion matrix.

A proportion selected from a range of 50% to 98%, preferably from a range of 70% to 98%, of the volume of the immersion matrix is formed by the pores or by the pores and the nanopores.

The optional formation of nanopores leads to an improved optical adjustment of the material of the immersion matrix and of the immersion liquid. A useful side effect of the nanoporous immersion matrix is its very low thermal conductivity. As a result, an optionally present objective which is in contact with the immersion matrix is thermally decoupled as a heat sink from a sample to be observed. This is advantageous for temperature stabilization of the sample, for example, in incubation applications (live-cell imaging, 37° C.).

The immersion matrix advantageously has a filling of the pores and existing nanopores with an immersion liquid.

It is advantageous when the immersion liquid and/or the size, distribution and proportion of the nanopores are chosen in such a way that the filled immersion matrix has a resultant or effective refractive index $n_{res}$ with a value within a range of 1.3 to 1.7.

It is possible in a further embodiment of the invention that the immersion matrix has pores of different pore sizes in a range of 0.5 nm to 200 µm. Such an immersion matrix, also referred to as a fractal immersion matrix, combines the advantages of the pores and the nanopores. In this case, not only pores of one or a few mean diameters but pores and nanopores with a variety of different diameters are present.

Since the immersion matrix can be designed with open or closed porosity and, in addition, the material of the immersion matrix can either be nanoporous or non-nanoporous, a number of possible embodiments result. The immersion matrix according to the invention can, for example, be:

closed-pore and filled with immersion liquid,
closed-pore and comprise closed-pore material (not advantageous),
closed-pore and comprise open-pore material,
open-pore (only pores, no nanopores in the material),
open-pore and comprise closed-pore material, or
open-pore and comprise open-pore material.

For both the porous immersion matrix as a whole and the nanoporous material, the open-pore variants provide the advantage that the immersion liquid, when in contact with a sample holder, such as a cover glass, and/or when in contact with a front lens of an objective, wets them and thus optically eliminates the interface. In case of a mechanical contact, the immersion matrix can be compressed and the immersion liquid can easily escape from the immersion sponge. Upon relaxation of the immersion matrix, for example, as a result of retraction of the objective, the immersion matrix reabsorbs the immersion liquid. The elasticity of the immersion matrix also advantageously reduces the risk of damage to the sample holder, the objective and/or the sample, since the immersion matrix is compressed in the event of excessive movement, for example, of the objective toward the sample holder.

If the immersion matrix is designed to be porous, i.e., open-pore, but without nanopores, and consists of a material the refractive index of which is close to that of the immersion liquid to be used, the aforementioned advantages, such as spatial delimitation of the immersion and mechanical flexibility, are achieved. However, the immersion liquid can only be freely selected within limits. In this case, it is advantageous if the volume fraction of the material of which the immersion matrix consists is as small as possible (preferably 2-30%, the proportion by volume of the pores and/or nanopores is accordingly 98-70%).

The permissible deviation of the refractive index of the immersion liquid from the refractive index of the matrix material is increased under these circumstances and is, for example, 4%-30%. For example, an effective index deviation of 0.02 is still tolerable if the refractive index of water ($n_{imm}$=1.33) is to be set, for example, and the achieved refractive index is $n_{mat}$=1.35.

The deviation of the refractive index of the material ($n_{mat}$) from the refractive index of the immersion liquid ($n_{imm}$) may in this case be greater than in the case of immersion means located near a focus of an optical arrangement. The immersion system according to the invention, in particular the immersion matrix filled with immersion liquid, is preferably arranged far away from the focus of the image. Any scattering occurring can be better tolerated if it occurs away from the image plane.

If the material of the immersion matrix itself is nanoporous, this embodiment additionally offers the advantage that the immersion liquid can be selected more freely. Since the walls and webs of the sponge structure are also themselves nanoporous and can absorb the immersion liquid, the refractive index of the material of the immersion matrix further adjusts to the refractive index of the immersion liquid.

For example, in order to allow incubation of the sample during an observation period or other additional applications, the immersion matrix may comprise or be in operative contact with a heating element. The heating element covers the immersion matrix on at least one of its sides and may, for example, be a heating ceramic, a heating wire or a heating plate. Such an embodiment can be used, for example, for direct in-vivo observations without cover glass or separation system.

The heating system may be transparent to an illumination radiation to be used and/or a detection radiation to be detected. The heating element or the heating elements may function as a separation system between the immersion matrix and the sample and may assume the function of a cover glass. The heating elements may be designed as a disposable product. With such a solution, local incubation of the sample is possible and contamination thereof is avoided at the same time.

As already mentioned, the immersion matrix can be used in the microscopic examination of a sample. In the process, at least one illumination radiation and/or one detection radiation is directed through the immersion matrix. In order to be able to compensate for any losses of the immersion liquid which occur, the immersion matrix can be part of an immersion device which, in addition to the immersion matrix, comprises a reservoir for storing and supplying the immersion liquid and a media line for conducting the immersion liquid to the immersion matrix. The immersion liquid can be supplied to the immersion matrix in a controlled manner. For this purpose, the immersion device can comprise a control unit and a pump, wherein the pump can be controlled by the control unit. Sensors for detecting losses and/or the feed quantity of the immersion liquid can moreover be installed.

In further embodiments of the immersion device, it is also possible for immersion liquid from the reservoir to be fed passively to the immersion matrix and to be activated, for example, by a difference in height between the reservoir and the immersion matrix and/or by pressure differences between the reservoir and the immersion matrix. Evaporating immersion liquid can thus lead to a suction effect in the media line and immersion liquid can be sucked in. Losses of immersion liquid—in particular by portions of the immersion liquid remaining on a sample holder ("snail track") when the sample holder and the immersion matrix are moved relatively to each other—can be prevented or reduced by means of a suitable coating.

Such a coating may be provided on the lateral surface of the sample holder that is in direct contact with the immersion matrix. Suitable coatings are known from the prior art (e.g., L. Yao et al. (2014), "Recent progress in antireflection and self-cleaning technology—from surface engineering to functional surfaces," Progress in Materials Science 61: 94-143). Corresponding repellency effects can also be achieved by laser beam processing of surfaces (Van Duong Ta et al. (2016), Laser textured superhydrophobic surfaces and their applications for homogeneous spot deposition, Applied Surface Science 365: 153-159).

Since an immersion with an immersion matrix according to the invention, in particular when the immersion matrix is soaked with immersion liquid, can readily be automated, this immersion matrix, in combination with coated surfaces of the sample holder, for example, constituting a significantly improved immersion. It combines the advantages of traditional immersion and elastomer immersion and reduces their disadvantages.

In principle, the invention is not limited to use only in microscopy. It can bridge spaces between optical elements or between interfaces of optical elements. Such distances can be air gaps. The invention advantageously makes it possible to vary the distance between the interfaces. Examples of applications beyond microscopy are prism coupling, for example, for refractometry on thin layers, or internal focusing within cemented members, or the use of cemented members with variable working distance. By means of the immersion matrix according to the invention, the connection of light guides is moreover possible.

With an immersion matrix according to the invention, such distances can be overcome in optical arrangements in which the immersion medium otherwise loses contact with an interface and separates, so that a disadvantageous air gap thus arises. The implementation of longer distances is particularly important for objectives that must be focused far into the sample, i.e., that require a correspondingly long mechanical working distance. Such objectives or optics are used if, for example, they are to be focused into liquid-filled chambers. Such chambers are, for example, the specimen chamber of a light-sheet microscope or spectrometer cuvette.

BRIEF DESCRIPTION OF THE DRAWINGS

The invention is explained in more detail below with reference to exemplary embodiments and images. Shown are.

DETAILED DESCRIPTION

Figure 1:
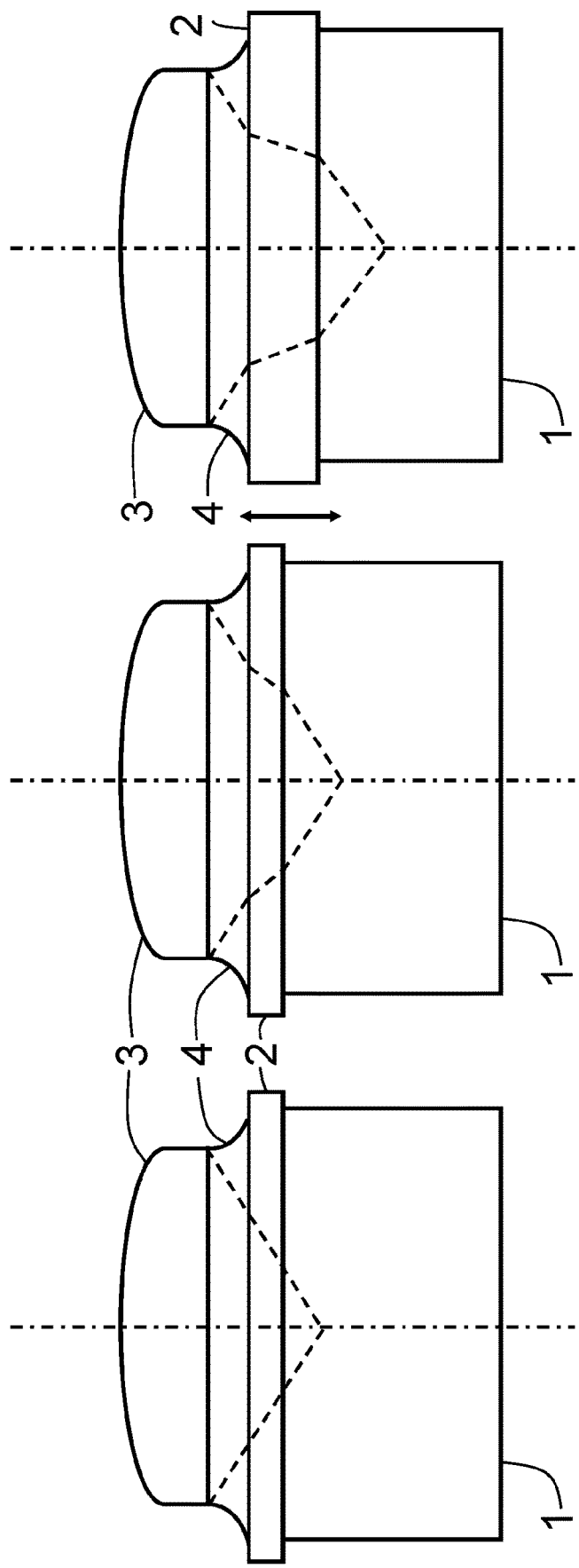
FIG. 1a a schematic representation of the prior art of an objective in the form of an immersion objective, a cover glass and a sample, wherein a medium in the form of an immersion medium is located between the objective and the cover glass, wherein the refractive indices are optimally adapted to one another.
FIG. 1b a schematic representation of the prior art of an objective in the form of an immersion objective, a cover glass and a sample, wherein a medium in the form of an immersion medium is located between the objective and the cover glass, wherein aberrations are caused by the cover glass.
FIG. 1c a schematic representation of the prior art of an objective in the form of an immersion objective, a cover glass and a sample, wherein a medium in the form of an immersion medium is located between the objective and the cover glass, wherein aberrations are reduced by means of a correction function.

The elements already introduced with respect to FIGS. 1a to 1c can also be found in the exemplary embodiments of the invention. Identical technical elements are provided with the same reference symbols.

Figure 2:
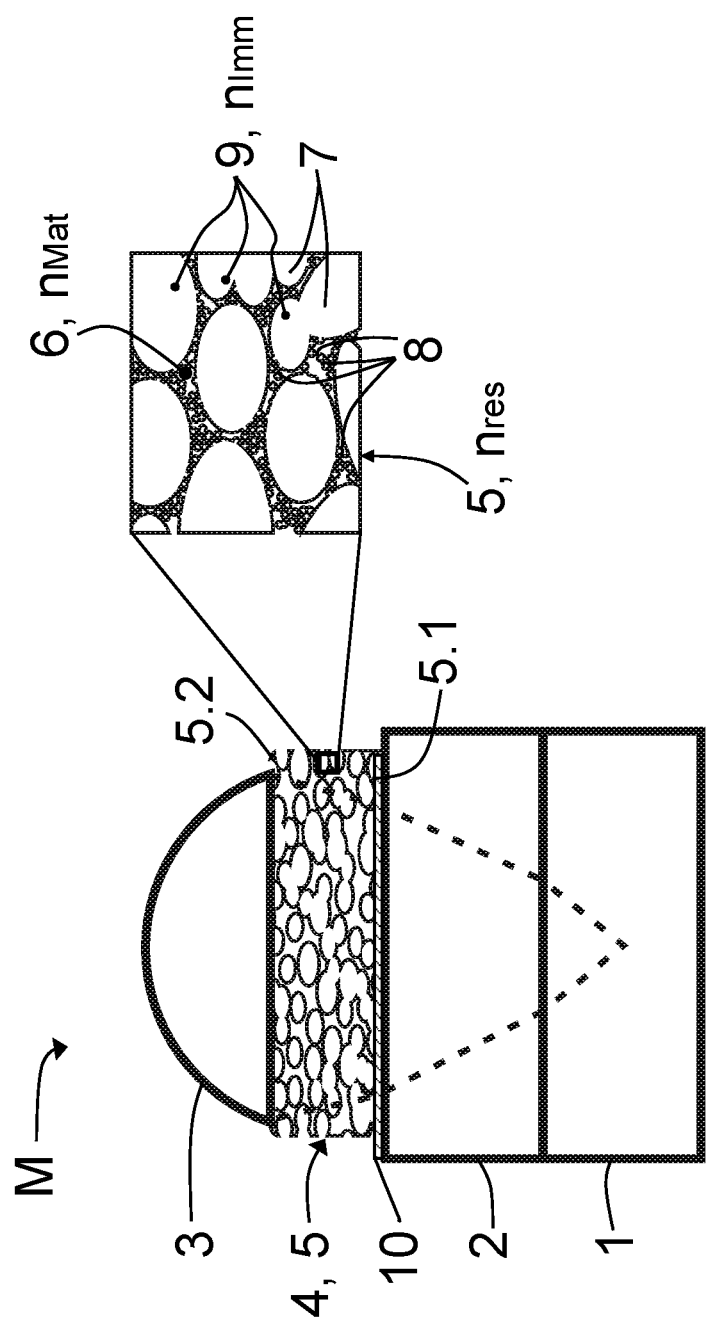
FIG. 2 a schematic representation of a first exemplary embodiment of an arrangement of an immersion matrix according to the invention, an objective, a sample holder and a sample, and an enlarged detailed representation of the nanoporous immersion sponge according to the invention.

FIG. 2 shows as immersion medium 4 an immersion matrix 5 according to the invention which is made of an elastic material 6 with an E modulus selected from a range of 0.1-100 MPa and which is arranged between an objective 3 of an optical arrangement M, for example, a microscope, not shown in more detail, and a sample carrier 2 in the form of a cover glass. A first lateral surface 5.1 of the immersion matrix 5 is in contact with the sample holder 2, while an opposite second lateral surface 5.2 is in direct contact with the objective 3. The material 6 has a refractive index $n_{mat}$. The immersion matrix 5 is in direct contact with one of its lateral surfaces with the sample carrier 2 and with the opposite lateral surface with the objective 3. The sample carrier 2 covers a sample 1 which is contained in an embedding medium and which is referred to here in a simplified manner as sample 1. The immersion matrix 5 is filled with an immersion liquid 9 having a refractive index $n_{imm}$ and has a resultant or effective refractive index $n_{res}$ of 1.4.

The surface of the sample carrier 2 in contact with the immersion matrix 5 or envisaged as coming into contact with the immersion matrix 5 is provided with a coating 10, which prevents or at least reduces adherence of the immersion matrix 5 and the immersion liquid 9 to the sample holder 2.

The pores 7, which are delimited by the material 6, can be seen in the enlarged detailed representation. The material 6 is open-pore, i.e., the majority of the pores 7 are connected to each other. It should be noted that the detailed representation only shows a section through a plane and that not all connections of the pores 7 to each other can therefore be seen.

In the walls and webs formed by the material 6 of the immersion matrix 5, there are nanopores 8 which are likewise filled with the immersion liquid 9.

Figure 3:
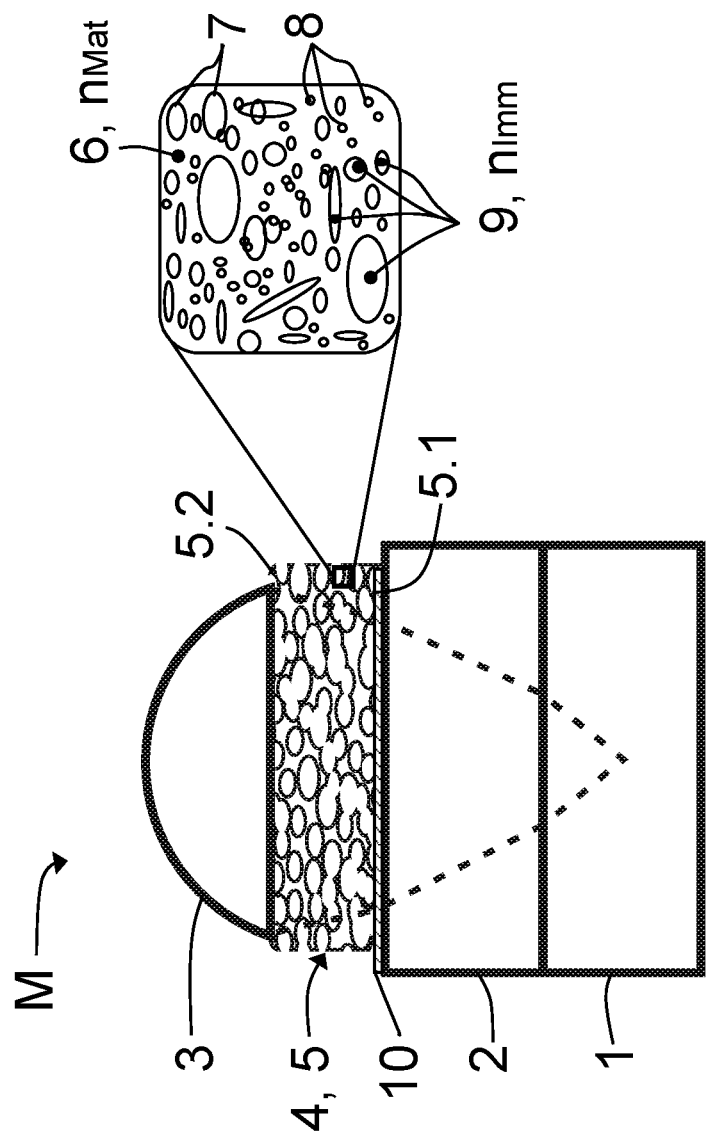
FIG. 3 a schematic representation of a second exemplary embodiment of an arrangement of an immersion matrix according to the invention, an objective, a sample holder and a sample and an enlarged detailed representation of the second exemplary embodiment of the nanoporous immersion matrix.

The detailed representation of FIG. 3 shows an immersion matrix 5 in an embodiment as a fractal immersion matrix 5. Pores 7 and nanopores 8 of different mean diameters are distributed in the material 6.

Figure 4C:
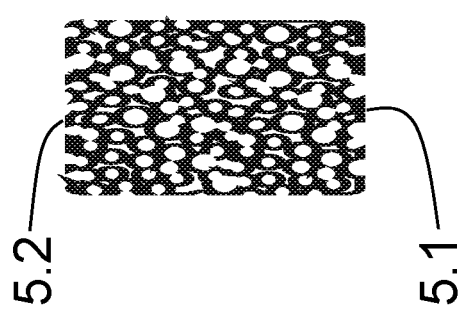
FIG. 4a a schematic representation of an exemplary embodiment of an immersion matrix according to the invention in the form of a cuboid, FIG. 4b a schematic representation of an exemplary embodiment of an immersion matrix according to the invention in the form of a prism or cone, FIG. 4c a schematic representation of an exemplary embodiment of an immersion matrix according to the invention in the form of a cylinder, FIG. 5 a schematic representation of a first exemplary embodiment of an immersion device according to the invention.
Figure 4B:
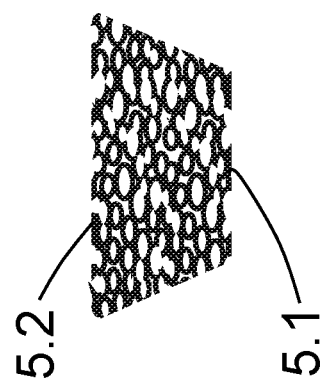
Figure 4A:
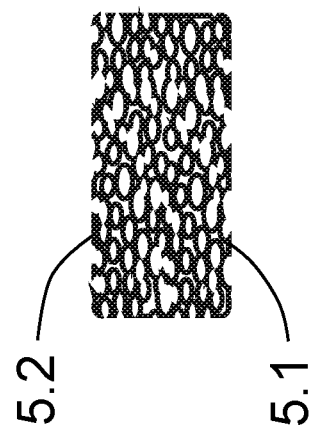

The immersion matrix 5 according to the invention can take the form of different shapes for an application. FIGS. 4a to 4c show examples of possible shape designs. A cuboid immersion matrix 5 is shown in FIG. 4a. The immersion matrix 5 comprises a first lateral surface 5.1 and an opposite second lateral surface 5.2. The two lateral surfaces 5.1 and 5.2 are envisaged as being brought into contact with the sample holder 2 or with the objective 3 (see FIGS. 2, 3 and 5). An immersion matrix 5 of this shape is versatile.

FIG. 4b schematically shows an immersion matrix 5 according to the invention in the form of a cone or prism. The extent of the second lateral surface 5.2 is greater than that of the first lateral surface 5.1. This shape facilitates use with objectives 3 of high numerical aperture and/or larger working distance ranges.

An immersion matrix 5 shown in FIG. 4c is cylindrical in shape and is suitable, for example, for large working distance ranges.

Figure 5:
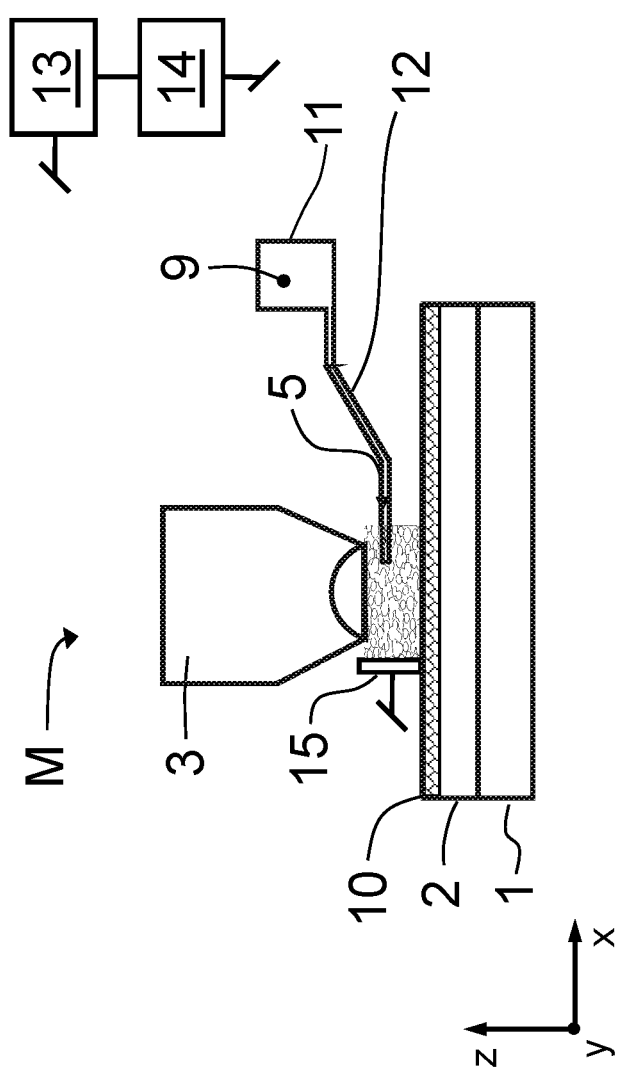

In addition to the immersion matrix 5, an immersion device shown in FIG. 5 comprises a reservoir 11 for storing immersion liquid 9. The reservoir 11 is connected to the immersion matrix 5 by means of a media line 12 so that immersion liquid 9 can be conducted from the reservoir 11 to the immersion matrix 5. The supply of the immersion liquid 9 can take place passively and, for example, be caused by a developing vacuum in the immersion matrix 5. In the embodiment shown, a control unit 13 is provided with which a pump 14 for actively conveying immersion liquid 9 from the reservoir 11 to the immersion matrix 5 can be controlled.

The objective 3 may be moved relatively to the coated lateral surface of the cover glass or of the sample holder 2 in an XY plane defined by the x and y axes of a Cartesian coordinate system. For this purpose, a drive not shown may be provided, which in turn can be controlled by the control unit 13.

This direct coupling of the immersion matrix 5 to the reservoir 11 is suitable for replacing volatile immersion liquids 9, for carrying out long-term observations and/or for allowing the objective 3 to travel a large distance relative to the sample holder 2 by compensating for losses of immersion liquid 9 occurring in the process. In these applications, there is the problem in the prior art that the immersion liquid 9 evaporates and/or remains on the sample holder 2. Conventionally, the space between the objective/front lens and the sample holder 2 is filled with immersion liquid by means of pump systems and tubes via a corresponding nozzle.

The immersion matrix 5 according to the invention offers two advantages: on the one hand, evaporation is already reduced by the immersion matrix 5 and, on the other hand, a media line 12, for example, in the form of a tube or a pipe, that is tapered appropriately and adjusted to the working distance, can open directly into the immersion matrix 5. Since a hydraulic connection is present here, losses of the immersion liquid 9 can be compensated for independently.

The immersion matrix 5 is provided with at least one heating element 15 on one of its lateral surfaces, which heating element is electrically operated and can be controlled by means of the control unit 13. The heating element 15 allows heating or cooling of the immersion matrix 5 and optionally a local heating or cooling of the sample 1.

In a further embodiment of the immersion device, a sensor (not shown), in particular a temperature sensor, may be present. This sensor detects a current temperature of the immersion matrix 5 and/or of the sample 1 as measured values. The detected measured values are made available to the control unit 13 so that a feedback control of the heating element/cooling element 15 is made possible.

The invention claimed is:

1. An apparatus comprising:
   an immersion matrix for adjusting optical properties to interfaces of optical arrangements, the immersion matrix including a material having a porosity with pores having an average pore size selected from a range of 20 nm to 200 µm in the material of the immersion matrix.

2. The apparatus according to claim 1, wherein the average pore size is selected from a range of 50 nm to 200 µm.

3. The apparatus according to claim 1, wherein the average pore size is selected from a range of 1 µm to 200 µm.

4. The apparatus according to claim 1, further comprising an immersion liquid within pores of the immersion matrix, wherein an elasticity modulus, E, of the immersion matrix filled with the immersion liquid is less than 1.5 GPa.

5. The apparatus according to claim 4, the immersion liquid is selected such that the immersion matrix filled with the immersion liquid has a resultant refractive index ($n_{res}$) with a value in a range of 1.3 to 1.7.

6. The apparatus according to claim 4, wherein the elasticity modulus, E, of the immersion matrix filled with the immersion liquid is selected from a range of 0.1-800 MPa.

7. The apparatus according to claim 4, wherein the elasticity modulus, E, of the immersion matrix filled with the immersion liquid is selected from a range of 0.1-100 MPa.

8. The apparatus according to claim 1, wherein the material has a refractive index $n_{mat}$ selected from a range of 1.4 to 1.8.

9. The apparatus according to claim 1, wherein the pores include closed pores.

10. The apparatus according to claim 1, wherein the pores include open pores.

11. The apparatus according to claim 1, wherein the material has a first extent on a first lateral surface and a second extent on a second lateral surface, wherein the extent of the second lateral surface is greater than an extent of the first lateral surface.

12. The apparatus according to claim 1, wherein the material further includes nanopores having an average pore size selected from a range of 0.5 nm to 20 nm in the material of the immersion matrix.

13. The apparatus according to claim 1, further comprising a heating element that covers the immersion matrix on at least one of its sides.

14. The apparatus according to claim 1, further comprising:
a first optical element; and
a second optical element,
wherein the immersion matrix is disposed between, and in contact with, a first interface of the first optical element and a second interface of the second optical elements.

15. The apparatus according to claim 14, wherein least one interface in contact with the immersion matrix has a surface that is not adhesive to the immersion matrix or to the immersion liquid.

16. The apparatus according to claim 14, further comprising:
a reservoir for storing an immersion liquid; and
a media line for providing the immersion liquid to the immersion matrix.

17. A microscopy method comprising:
providing illumination radiation to a sample; and
receiving detection radiation from the sample in response to the illumination radiation interacting with the sample,
wherein the illumination radiation and/or detection radiation is/are directed through an immersion matrix that includes a material having a porosity with pores having an average pore size selected from a range of 20 nm to 200 µm in the material of the immersion matrix.

18. The microscopy method of claim 17, wherein the average pore size is selected from a range of 1 µm to 200 µm and wherein an immersion liquid is included within pores of the immersion matrix, wherein an elasticity modulus, E, of the immersion matrix filled with the immersion liquid is less than 1.5 GPa.

19. The microscopy method of claim 18, the immersion liquid is selected such that the immersion matrix filled with the immersion liquid has a resultant refractive index ($n_{res}$) with a value in a range of 1.3 to 1.7.

20. The microscopy method of claim 18, wherein the elasticity modulus, E, of the immersion matrix filled with the immersion liquid is selected from a range of 0.1-800 MPa.

21. The microscopy method of claim 17, wherein the immersion matrix further includes nanopores having an average pore size selected from a range of 0.5 nm to 20 nm.

* * * * *